Aug. 21, 1934.   R. W. TRYON ET AL   1,970,718
FRANGIBLE ROD AND DISK TYPE SAFETY VALVE
Filed Jan. 9, 1932
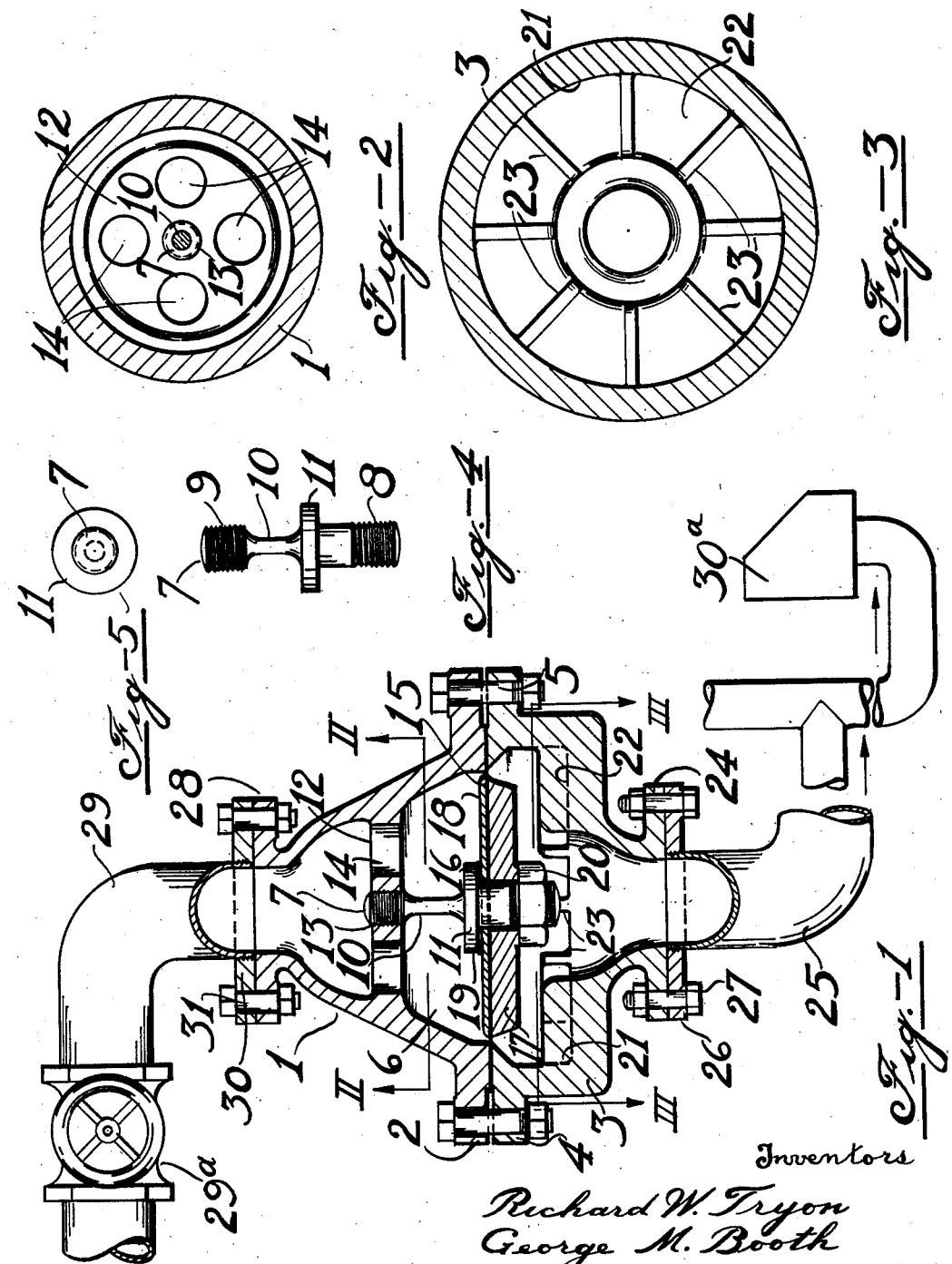
Inventors
Richard W. Tryon
George M. Booth
By
W. E. Currie Attorney Patented Aug. 21, 1934

1,970,718

UNITED STATES PATENT OFFICE 1,970,718

FRANGIBLE ROD AND DISK TYPE SAFETY VALVE

Richard W. Tryon and George M. Booth, Elizabeth, N. J., assignors to Standard Oil Development Company, a corporation of Delaware Application January 9, 1932, Serial No. 585,718

11 Claims. (Cl. 220—89)

This invention relates to improvements in automatic release devices of the frangible type for containers which may be subjected to excessive pressure. The principal object of the invention is to provide a release device in which the frangible element is adapted to yield on direct tension. This is applied by pressure acting on a member of large cross-section area carried by the frangible element and adapted to be ruptured after the yielding of the frangible member. Other objects of the invention are to minimize the danger of corrosion, distortion and fatigue of metal, and the like, which may make release devices of the ordinary frangible disk type inoperative. The invention will be fully understood from the following description, read in connection with the accompanying drawing in which:

Fig. 1 is a vertical section through a preferred form of the invention;

Fig. 2 is a transverse section on line II—II of Fig. 1 looking up;

Fig. 3 is a transverse section on line III—III of Fig. 1 looking down;

Fig. 4 is a full elevation view of the frangible element of Fig. 1; and

Fig. 5 is a top view of Fig. 4.

In the drawing, reference numeral 1 denotes a dome shaped casting having an annular flange 2. A cylindrical casting 3 has a corresponding annular flange 4. The flanges are secured together by bolts 5. Casting 3 has an enlarged cylindrical opening in the upper portion. The lower portion has a smaller cylindrical opening in the center formed by a right angular curvature of the walls of the casting.

Within the casing 6 thus formed by the two castings, there is provided a frangible element which is preferably in the form of a rod 7. The frangible element 7 is threaded on both ends 8 and 9. The frangible element is indented or cut away at an intermediate portion to form a weakened section 10. Below this section the frangible element 7 carries a circular flange 11.

A spider or platform 12 cast as part of the casting 1 extends between the sloping walls of casting 1. The spider 12 is disposed in spaced relation to the enlarged portion of the casing 6. The spider 12 has a central threaded opening 13 adapted to support the frangible element 7 by means of the threaded end 9. The spider 12 has openings 14 so as to allow free flow of fluids.

A flexibly mounted frangible diaphragm or disk 15 has a central opening 16 which fits over the frangible element 7 below the flange 11. The outer margin of diaphragm 15 is clamped between the flanges 2 and 4 so as to make a fluid-tight joint with them. Backing plates 17 and 18 are provided one on each side of the diaphragm.

The portion of the frangible element 7 below the flange 11 is inserted through the opening 16. A suitable gasket 19 is provided between the flange 11 and the upper backing plate 18. Nut 20 screwed on the end of the frangible element 7 supports the assembly of diaphragm 15, gasket 19 and backing plates 17 and 18, making a fluid-tight joint with them.

Casting 3 has an enlarged central cylindrical upper aperture defined by rim 21 and floor 22, joined by the right angular curvature of the walls of the casting. Spaced ridges or raised portions 23 of the floor 22 project radially a part of the distance towards the center of the casing 6. Casting 3 has a smaller annular flange 24 on a narrowed portion. The flange is adapted to be secured to an outlet pipe 25 having a flange 26 by means of bolts 27.

Casting 1 has a smaller annular flange 28 on a narrowed portion. The flange is adapted to be secured to an inlet pipe 29 having a flange 30 by means of bolts 31.

The container on which the release device is to be used is connected with it through an inlet pipe 29, provided with a manually operable valve 29a opening into casing 6. Casing 6 is also connected with outlet pipe 25. Outlet pipe 25 connected with casting 3 is provided with a lookbox or other suitable indicating device 30a.

The frangible element is preferably made of a rod of cast iron. The extent to which the rod is weakened by cutting away at the section 10 is determined by the amount of pressure which the device is to withstand. It will be observed that the area of diaphragm 15 is very large compared with the cross-sectional area through section 10. Accordingly, pressure exerted on the upper face of the diaphragm has a multiplied effect on the frangible element. Section 10 may, therefore, be made relatively thick and thereby resistant to failure through corrosion, but the section will nevertheless yield at the required pressure.

The diaphragm 15 is made of any ductile and flexible metal such as lead. The strength of this material should be such as to amply sustain the small shearing load imposed upon the exposed narrow annular area at the periphery of the backing plates, yet should be of such strength as to insure immediate failure in shear as soon as the tension rod failure allows the total load upon the backing plates to be transmitted directly to the diaphragm at the periphery. The backing plates 17 and 18 are best made of steel. They should be heavy and cover as much diaphragm area as is practical.

The operation of the device is as follows:

When the pressure in the container, as transmitted through pipe 29, exceeds the value which the frangible element 7 is designed to withstand, that element is ruptured at the section 10 by the downward push of the backing plates 17 and 18 and the diaphragm 15. Immediately after the element 7 breaks, the diaphragm being inadequate to withstand alone the full pressure load on the backing plates, will rupture at the margin. The backing plates and the diaphragm 15 fall on the ridges 23. Pressure is thereupon relieved by gas or liquid escaping from casing 6 by passing underneath the diaphragm 15 which is supported by the ridges 23 and through pipe 25. By providing two members breaking in sequence as described, an unusually accurate and safe control of the allowable maximum pressure can be obtained.

The operator will detect the failure of the device by observing the look-box 30a, or other suitable signal that may be supplied. Valve 29a will then be closed and the safety device placed in operative condition.

A liquid such as glycerin, heavy petroleum oil, or the like is used to protect the frangible element from contact with corrosive gases or liquid. The structure is mounted vertically though it may be placed in any other position with a suitable trap placed in the pipe 29 by which the liquid seal is retained. This arrangement is desirable when very corrosive substances are likely to come in contact with the frangible element. Other means of protecting the element may be adopted such as anti-corrosion paints, plating and the like.

The foregoing description is illustrative only and various changes and alternative arrangements may be made within the scope of the appended claims, in which it is our intention to claim all novelty inherent in the invention as broadly as the prior art permits.

This is a continuation in part of our copending application Serial No. 498,098 filed November 25, 1930.

We claim:

1. A pressure release device comprising a solid rod having a weakened section, a flexibly mounted frangible diaphragm carried by said rod and adapted to be moved by pressure, means for transmitting pressure to the flexibly mounted diaphragm for exerting tension longitudinally upon the rod, said diaphragm being adapted to rupture when the rod breaks, and means whereby pressure is vented through the diaphragm.

2. A pressure release device, comprising a casing, a flexibly mounted diaphragm therein, a solid rod having a weakened section secured to the diaphragm, means for causing the diaphragm to be ruptured by excess pressure, after the rod breaks, and means for relieving the pressure.

3. A pressure release device, comprising a casing, a flexible mounted frangible diaphragm therein, a separate solid frangible element mounted so as to be ruptured by the displacement of the diaphragm, means for venting pressure from the casing when the solid frangible element and the frangible diaphragm are ruptured, the casing having an opening through which the pressure is released into a line and an indicating device in the line so arranged as to show that pressure has been vented.

4. In a pressure release device a flexibly mounted support having a separate solid frangible element secured thereto and adapted to be ruptured by displacement of the support, said support comprising two plates and a flexible diaphragm between the two plates, said diaphragm being adapted to rupture when the frangible element breaks, and means whereby pressure is vented through the diaphragm.

5. Apparatus according to claim 4 in which the diaphragm is held marginally by the abutting surfaces of flanged castings, so that the diaphragm forms a central partition within the castings and the separate solid frangible element is mounted for movement with the diaphragm.

6. A pressure release device, comprising a casing, a flexibly mounted frangible diaphragm therein, movable backing plates supporting the diaphragm, a solid rod having a weakened section supported rigidly at one end and connected to the diagram and backing plates at the other end, means for transmitting pressure to the backing plates and diaphragm, and means for venting pressure through the frangible diaphragm when the rod and diaphragm are ruptured.

7. A pressure release device, comprising a casing having an inlet for fluid under pressure, a flexible frangible diaphragm extending across the casing, a solid frangible rod extending substantially at right angles to the diaphragm on the inlet side of the diaphragm and secured at one end to the diaphragm, means for supporting the other end of the rod, whereby increase of the fluid pressure passed into the casing places sufficient tension upon the rod to rupture the rod, and means for venting pressure through the frangible diaphragm when the rod and diaphragm are ruptured.

8. A pressure release device, comprising a casing having an inlet and outlet on opposite sides of the casing, a flexible diaphragm extending across the casing between the inlet and outlet, a solid frangible rod of material having a high ratio of elastic limit to ultimate strength, extending at substantially right angles to the diaphragm supported rigidly at one end by the casing on the inlet side of the diaphragm and connected to the diaphragm at the other end, whereby increase of the fluid pressure ruptures the rod.

9. A pressure release device, comprising a casing having an inlet for fluid under pressure and having an outlet, a relatively thin metal diaphragm extending across the casing between the inlet and outlet, backing plates secured to the central portion of the diaphragm, a solid rod having a weakened section and held rigidly at one end by the casing on the inlet side of the diaphragm and connected to the diaphragm and backing plates at its opposite end, the rod extending substantially at right angles to the diaphragm, whereby pressure is transmitted from the backing plates to the solid rod causing pure tension to occur at the weakened section of the rod.

10. A pressure release device, comprising a casing having an inlet for fluid under pressure and having an outlet, a flexible diaphragm extending across the casing between the inlet and outlet, a solid frangible rod supported at one end rigidly by the casing on the inlet side of the diaphragm and connected to the diaphragm at its opposite end, the strength of the rod and diaphragm being so proportioned that increase of the fluid pressure ruptures first the rod and then the diaphragm and permits escape of the fluid through the outlet.

11. A pressure release device, comprising a casing having an inlet for fluid under pressure and having an outlet, a relatively thin metal disk having an annular marginal portion extending transversely across the casing between the inlet and outlet and secured to the casing, a reinforcing mass united to and disposed centrally within the annular portion, a solid frangible rod secured at one end to the reinforcing mass and supported on its opposite end by the casing on the inlet side of the diaphragm, the strength of the rod and diaphragm being so proportioned that the diaphragm is subjected to but a small fraction of the total existing fluid pressure until such time as the rod is ruptured, at which time the diaphragm is subjected to pressure of greater magnitude than that required to cause it to fail at the marginal portion and escape of the fluid is permitted through the outlet.

RICHARD W. TRYON.
GEORGE M. BOOTH.